US006611499B1

United States Patent
D'Souza

(10) Patent No.: US 6,611,499 B1
(45) Date of Patent: Aug. 26, 2003

(54) METHOD FOR MEASURING THE AVAILABILITY OF ROUTER-BASED CONNECTIONLESS NETWORKS

(75) Inventor: Kevin L D'Souza, Bensalem, PA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/271,715

(22) Filed: Mar. 18, 1999

(51) Int. Cl.[7] .................................................. H04J 1/16
(52) U.S. Cl. ........................ 370/252; 370/254; 709/238
(58) Field of Search ................................. 370/216, 229, 370/241, 248, 250, 252, 254, 351, 352, 233; 709/223, 224, 238, 229

(56) References Cited

U.S. PATENT DOCUMENTS

| | | | |
|---|---|---|---|
| 5,675,741 A | | 10/1997 | Aggarwal et al. |
| 5,734,811 A | * | 3/1998 | Croslin .................. 395/182.02 |
| 5,926,463 A | * | 7/1999 | Ahearn et al. ............... 370/254 |
| 6,003,090 A | * | 12/1999 | Puranik et al. ............. 709/235 |
| 6,219,753 B1 | * | 4/2001 | Richardson ................. 711/114 |
| 6,421,731 B1 | * | 7/2002 | Ciotti, Jr. et al. ........... 709/238 |

OTHER PUBLICATIONS

"A Measure of Connectivity for Geographic Regions," by D. W. Bange et al, Professional Geographer, vol. 28, No. 4, 1976, pp. 362–370, XP000972564.

"SNMP, SNMPV2 and CMIP—The Technologies for Multivendor Network Management," by R. Hunt, Computer Communications, NL, Elsevier Science Publishers BV, Amsterdam, vol. 20, No. 2, Mar. 1, 1997, pp. 73–88, XP000688489, ISSN: 0140–3664.

"Bulk Table Retrieval with the SNMP," by M. Rose et al, Request for Comments (RFC) 1187, 'Online! 1990, XP002155467, Retrieved from the Internet: <URL:http://www.cis.ohio–state.edu/rfc/rfc 1187.txt> 'retrieved on Dec. 12, 2000!, XP–002155567.

"Cisco Router Configuration," by A. Leinwand et al, 1998, CISCO Press XP–002155468, p. 243, paragraph 1.

Communication and European Search Report dated Jan. 11, 2001, The Hague, Examiner E. Bertolissi, 3 pages.

* cited by examiner

Primary Examiner—Hassan Kizou
Assistant Examiner—John Pezzlo

(57) ABSTRACT

The availability of a connectionless network (10) is determined by first identifying all possible data destinations. Stated another way, all possible network endpoints are determined. Thereafter, the routing tables (36, 38 and 40) within the routers (12, 14, 16) of the network are examined to determine whether a route exists to each endpoint. The availability of the network is then established by comparing the available routes to endpoints to the number of endpoints. If a route exists to every endpoint, then the network 10 is fully available. The lack of a route to an endpoint diminishes network availability.

6 Claims, 2 Drawing Sheets

METHOD FOR MEASURING THE AVAILABILITY OF ROUTER-BASED CONNECTIONLESS NETWORKS

TECHNICAL FIELD

The present invention relates to a technique for determining the availability of a router-based connectionless network for transporting packets from individual data sources to various data destinations.

BACKGROUND ART

Present day data networks typically comprise routers that route data packets over one or more links between individual sources and destinations of data, each typically comprising a customer's computer. Successful routing of data packets requires that at least one logical path (a collection of one or more physical links inter-connected by routers) exist in the network between the source and destination for each packet. For that reason, each router maintains data, in the form of a routing table, that identifies different destinations and the links that router enjoys to those destinations in the network. Using the knowledge of the data destinations in its routing table, each router can determine the identity of the downstream router (or next hop) that should receive a packet in accordance with the destination of that packet specified in its header. Assuming the network possesses sufficient physical redundancy (e.g., multiple routers and multiple links), the network can dynamically redefine paths using protocols such as the Border Gateway Protocol (BGP) or Open Shortest Path First (OSPF) protocol, in case of a router or link failure. The use of such protocols ensures that no one router or link failure disrupts the flow of packets between a particular data source and destination.

Entities that maintain data networks of the type described above strive for high reliability. To that end, such entities seek to maximize the network availability, which is defined as the ratio of the actual service time to scheduled service time. Heretofore, network managers monitored network availability by monitoring the availability of individual network routers and their associated links, that is the ratio of the actual router and link operating time to the scheduled operating time. Unfortunately, attempting to approximate network availability based on router and link availability does not provide an accurate measure of availability in a connectionless network because packets travel across multiple dynamically defined paths and typically cross a number of individual routers and their associated links. A failure of one or more routers often will not effect the network's ability to route a packet from a particular source to a particular destination, since in that case an alternate path may exist.

Another approach to establishing network availability is to launch a prescribed packet (e.g., a "ping") to a particular destination and then await a response. While this method affords a more accurate method of monitoring performance, active monitoring in this manner is impractical for large networks because the number ingress-egress path combinations increases by the factor n x (n−1) where n is the total number of ingress and egress points. Moreover, not every ingress and egress point is accessible to permit such active monitoring.

Thus, there is need for a technique for providing accurate monitoring of the availability of a data network irrespective of its size.

BRIEF SUMMARY OF THE INVENTION

Briefly, the present invention provides a technique for determining the availability of a connectionless network that includes routers for routing data from different sources (e.g., source networks) to different destinations (e.g., destination networks) across paths comprised of one or more links. Network availability is determined by first identifying all potential destinations of data. In other words, all network endpoints are established. Next, the routing table in each router is examined to determine whether a route exists through the network to each destination endpoint. If a route exists, then a path between the endpoints is presumed available. The network availability is established by comparing the available paths within the network to the total number of endpoint pairs. Thus, for example, if a path exists to every destination endpoint, the network is fully available. In contrast, the availability of the network is diminished by the unavailability of paths to destination endpoints.

DETAILED DESCRIPTION

Figure 1:
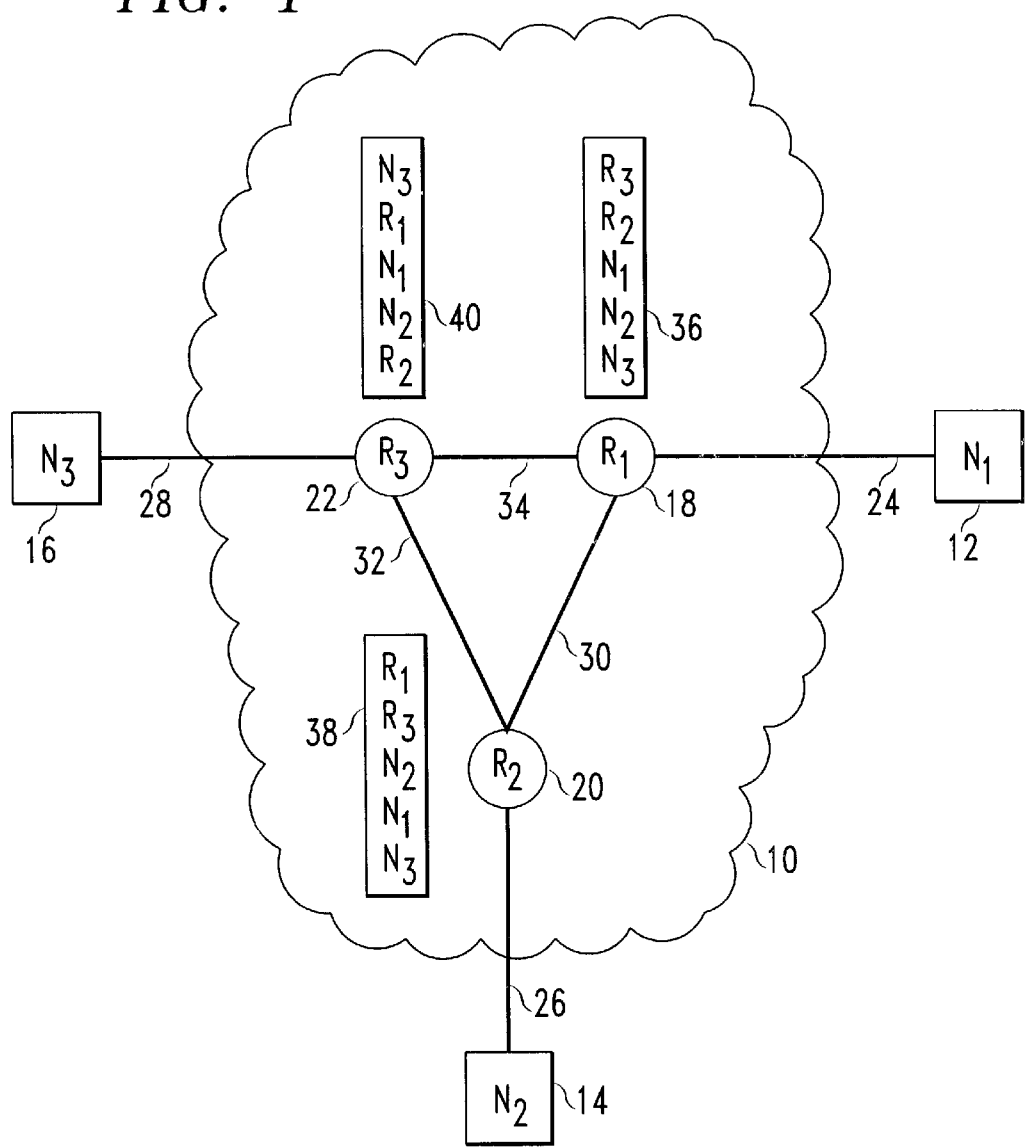
FIG. 1 depicts a block schematic diagram of a data network in accordance with a preferred embodiment of the invention.

FIG. 1 depicts a backbone data network 10 in accordance with a preferred embodiment of the invention for transporting data packets (not shown) among edge networks $N_1$, $N_2$, and $N_3$, identified in FIG. 1 by the reference numerals 12, 14, and 16, respectively. The backbone network 10 typically belongs to a telecommunications service provider, such as AT&T, whereas the edge networks $N_1$, $N_2$, and $N_3$ typically belong to individual customers of the telecommunications provider. The network 10 typically includes a plurality of routers, exemplified by routers $R_1$, $R_2$, and $R_3$, identified by reference numerals 18, 20, and 22, respectively. A variety of suppliers, such as Cisco, Bay Networks, and Ascend Communications, manufacture routers of the type depicted in FIG. 1.

The edge networks $N_1$, $N_2$, and $N_3$ are "homed" to the routers $R_1$, $R_2$, and $R_3$, respectively. In other words, the routers $R_1$, $R_2$, and $R_3$ serve as gateways for the edge networks $N_1$, $N_2$, and $N_3$, respectively, to route packets originated at a corresponding edge network to a downstream destination, as well as to route packets from an upstream destination source to the edge network. To that end, the routers $R_1$, $R_2$, and $R_3$ maintain links 24, 26, and 28, respectively to the networks $N_1$, $N_2$, and $N_3$, respectively. Additionally, links 30, 32 and 34, couple the router pairs $R_1$–$R_2$, $R_2$–$R_3$, and $R_3$–$R_1$ respectively.

While the routers $R_1$, $R_2$, and $R_3$ enjoy links among themselves and to a corresponding one of edge networks $N_1$, N, and $N_3$, respectively, the backbone network 10 is connectionless because each data packet traversing the backbone network travels independently of the others. The routers $R_1$, $R_2$, and $R_3$ maintain information, in the form of routing tables 36, 38, and 40, respectively, that list the links each router enjoys with other routers, and potential downstream destinations served by such routers. For example, the router $R_1$ enjoys direct links to the routers $R_2$ and $R_3$, and enjoys a direct link to the edge network $N_1$. In additional, by virtue of its links to the routers $R_2$ and $R_3$, the router $R_1$ can route packets to downstream destinations, such as the edge networks $N_2$ and $N_3$ across either of those links. Thus, the routing table 36 associated with the router $R_1$ lists $R_2$, $R_3$, $N_1$, $N_2$, and $N_3$ as potential destinations available to that router. The routing tables 38 and 40 similarly contain the destinations available to the routers $R_2$ and $R_3$, respectively.

The absence of a destination in the routing table associated with a particular router indicates the lack of an available path from that router to the destination. Thus, for example, upon a failure of the link 26, or upon failure of the router $R_2$, the router $R_1$ can no longer route packets to the edge network $N_2$. In practice, the routers communicate among each other regarding their individual status and that of their connecting links, thus allowing each router to learn of any such failures. Upon learning of the failure of router $R_2$ for example, the router $R_1$ will alter its routing table accordingly, removing $R_2$ and edge network $N_2$ as possible downstream destinations. In contrast, should the link 34 fail, the routers $R_1$ and $R_3$ can still route traffic between them via router $R_2$, requiring no alteration of routing tables 36 and 40.

As may now be appreciated, connectionless networks, such as network 10, typically possess multiple logical paths between data sources and data destinations. Thus, a packet injected into the network at router $R_1$ from the network $N_1$ may traverse multiple routers, before reaching its destination. Although present data networks, such as network 10, may enjoy physical redundancy, in the form of possible multiple paths between sources and destinations, such physical redundancy does not necessarily insure that the network can necessarily route a packet to its specified destination. For example, the lack of an entry in the routing table 36 of the router $R_1$ listing edge network $N_2$ as a possible destination will preclude the router $R_1$ from routing packets to network $N_2$. Thus, attempting to measure the availability of the network 10 in terms of the ratio of actual router service time to scheduled service time, a common measure of network availability, will not yield accurate results. Even if a router, say Router $R_1$ is available, the inability of that router to route packets to another destination will adversely affect the availability of the network 10 to carry data.

Figure 2:
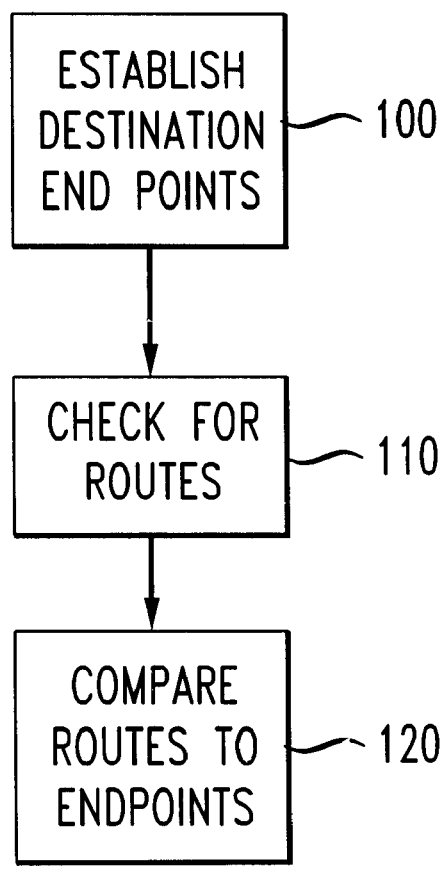
FIG. 2 illustrates in flow chart form the steps of the method of the invention for detecting and isolating connectivity troubles in the network of FIG. 1.

In accordance with the invention, there is provided a method for determining the availability of the network in accordance with destination information in the routing tables, e.g., the routing tables 36, 38, and 40 of the routers $R_1$, $R_2$, and $R_3$ in network 10 of FIG. 1. The steps of the method of the invention are depicted in flow chart form in FIG. 2. As best illustrated in FIG. 2, to measure network availability, the destination endpoints of the network 10 are first determined (step 100). Thus, for example, with regard to network 10, the end points of the network 10 (e.g., the edge networks $N_1$, $N_2$, and $N_3$) are identified.

Once the endpoints of the network 10 are identified, the existence of a route to each such endpoint is verified (step 110). In practice, the existence of the route is determined from existence of entry in the associated routing table of a corresponding router listing the particular endpoint. For example, with respect to a packet received at router $R_1$ and destined for edge network $N_3$, if the routing table 36 for router $R_1$ lists an entry for that endpoint, then a route exists.

Various techniques exist for obtaining the information in the routing table for each router. For example, a central controller (not shown) could issue a Simple Network Management Protocol (SNMP) GET request to each router with the destination endpoint in the query to establish the information stored in the ipRouteDestination and ipRouteMask Management Information Base (MIB) variables. Upon receipt of such a request, each router returns an MIB string with the route attached, as well as its mask, if indeed such a route exists. Alternatively, a connection, such as via the Telenet protocol, could be established with each router and a command to show ip route <Route> could be executed. In response, the router will return the route, if it exists, as well as its mask. Another approach, although less direct, would be to cause the router to execute its debugging option and write the output produced as a result to a file, such as the syslog file. Any route changes are obtained using conventional post-processing methods.

Having determined from the entry in the routing table of a router the presence of a route to an endpoint, the network availability is then established (step 120) by the ratio of the routes that exist in the network between endpoints, as determined during step 110, to the number of possible endpoints determined during step 100. Thus, for example, if a route exists between every pair of endpoints, then the network 10 is fully available. The lack of a route between a pair of endpoints diminishes network availability. If only 90% of the pairs of endpoints have associated routes, then the network is said to be 90% available. A good measure of network availability can be given by the relationship $$\text{Network Availability} = \frac{\sum \text{available routes-to-endpoints}}{\sum \text{network endpoint pairs}}$$

Measuring network availability by a comparison of the available routes, as determined from the routing information in the router's routing tables, to the network endpoints, accounts for network redundancy, an important criterion ignored by prior art techniques. In practice, the steps of 110 and 120 are repeated periodically to provide a periodic measure of network availability.

The above-described embodiments merely illustrate the principles of the invention. Those skilled in the art may make various modifications and changes that will embody the principles of the invention and fall within the spirit and scope thereof.

What is claimed is:

1. A method for monitoring a data network that includes a plurality of routers that collectively operate to route data packets over logical paths between data sources and data destinations in accordance with information contained in a routing table in each router that specifies the downstream destination for a data packet in accordance with information contained in said packet, comprising:

(a) establishing for the network a list of data destinations for which a data packet originating at the data source is destined;

(b) examining the routing table of each router to determine whether the routing information collectively contained in said router routing tables specifies an available route to a data destination;

(c) repeating step (b) until the routing tables of all the routers are examined; and (d) establishing a data network monitoring parameter that is a function of the number of available routes between endpoints determined in step (b) and is a further function of the number of endpoints.

2. The method according to claim 1 wherein the steps of (b)–(d) are periodically repeated.

3. The method according to claim 1 wherein the data network monitoring parameter is established in accordance with the ratio:

$$\frac{\sum \text{available routes-to-endpoints}}{\sum \text{network endpoint pairs}}$$

4. The method according to claim 1 wherein the step of examining the routing table of each router includes the step of:

issuing a Simple Network Management Protocol (SNMP) GET request to establish ipRouteDestination and ipRouteMask Management Information Base (MIB) information.

5. The method according to claim 1 wherein the step of examining the routing table of each router includes the step of:

establishing a connection with each router to cause it to execute a command show ip route <Route>.

6. The method according to claim 1 wherein the step of examining the routing table of each router includes the steps of:

causing the router to execute its debugging option;

writing to a file information produced by the routing during debugging; and examining the file to ascertain available routes.

* * * * *